Oct. 1, 1935.  R. I. MARTIN  2,015,685
MACHINE TOOL
Filed Aug. 14, 1931  4 Sheets-Sheet 3
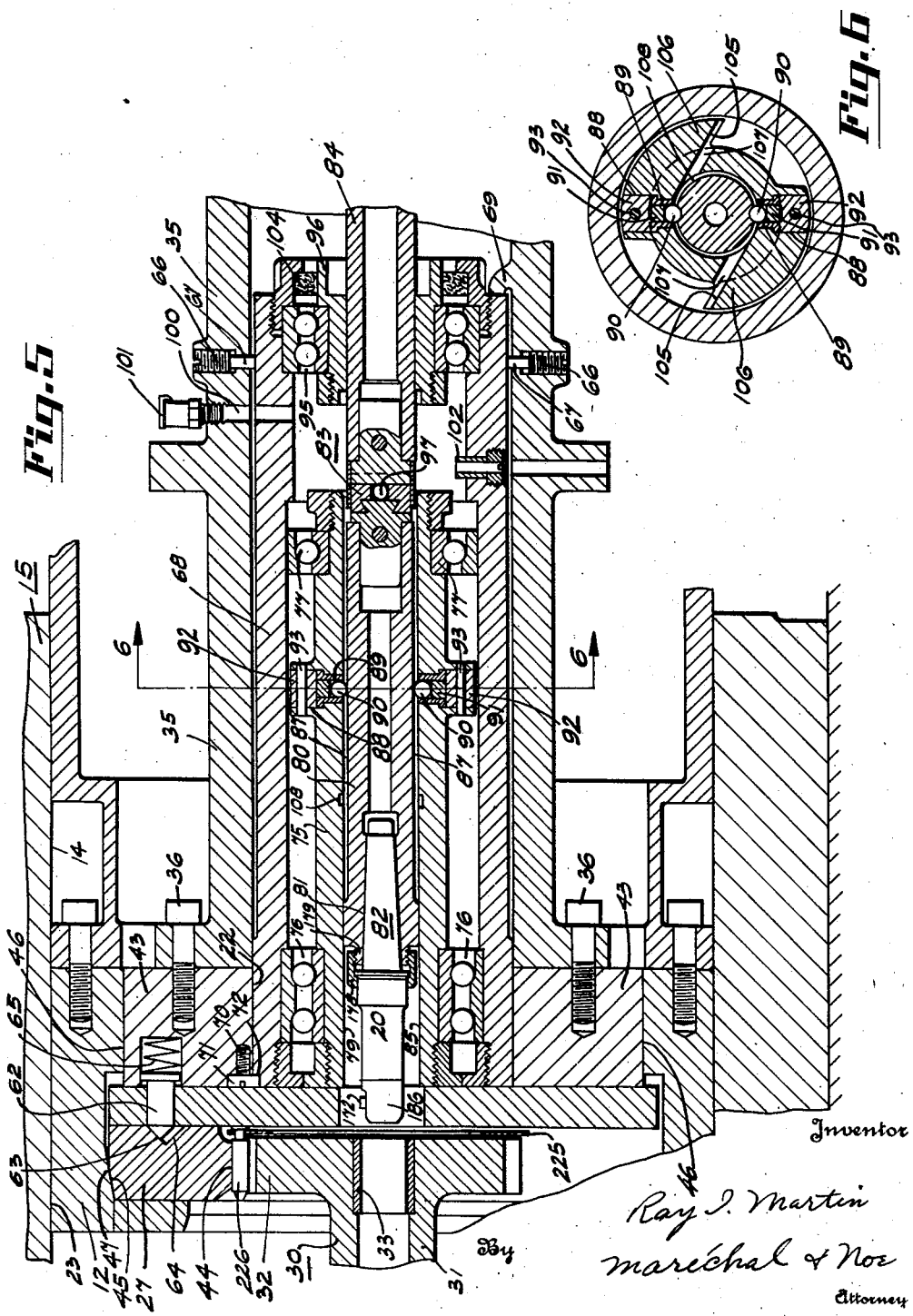

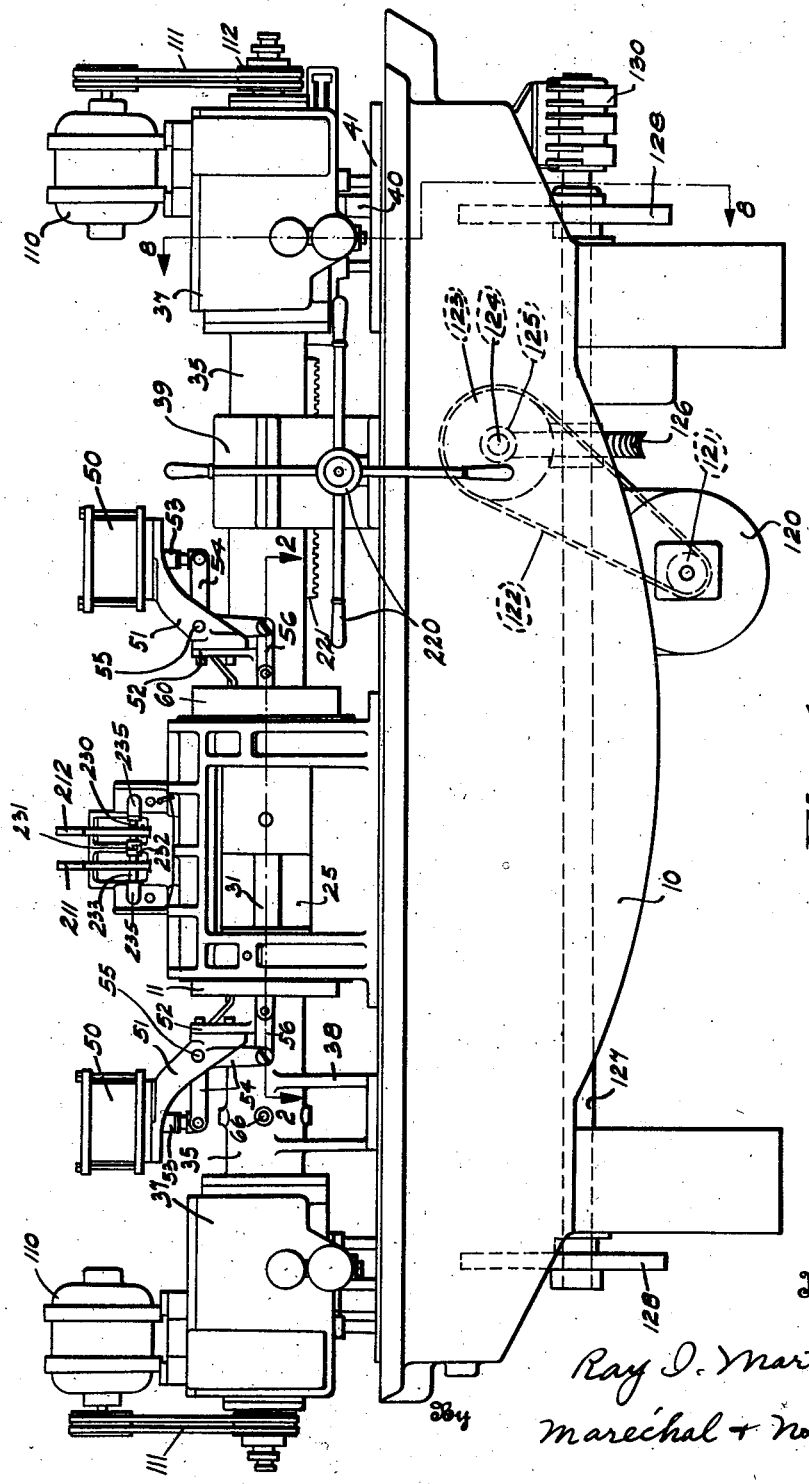

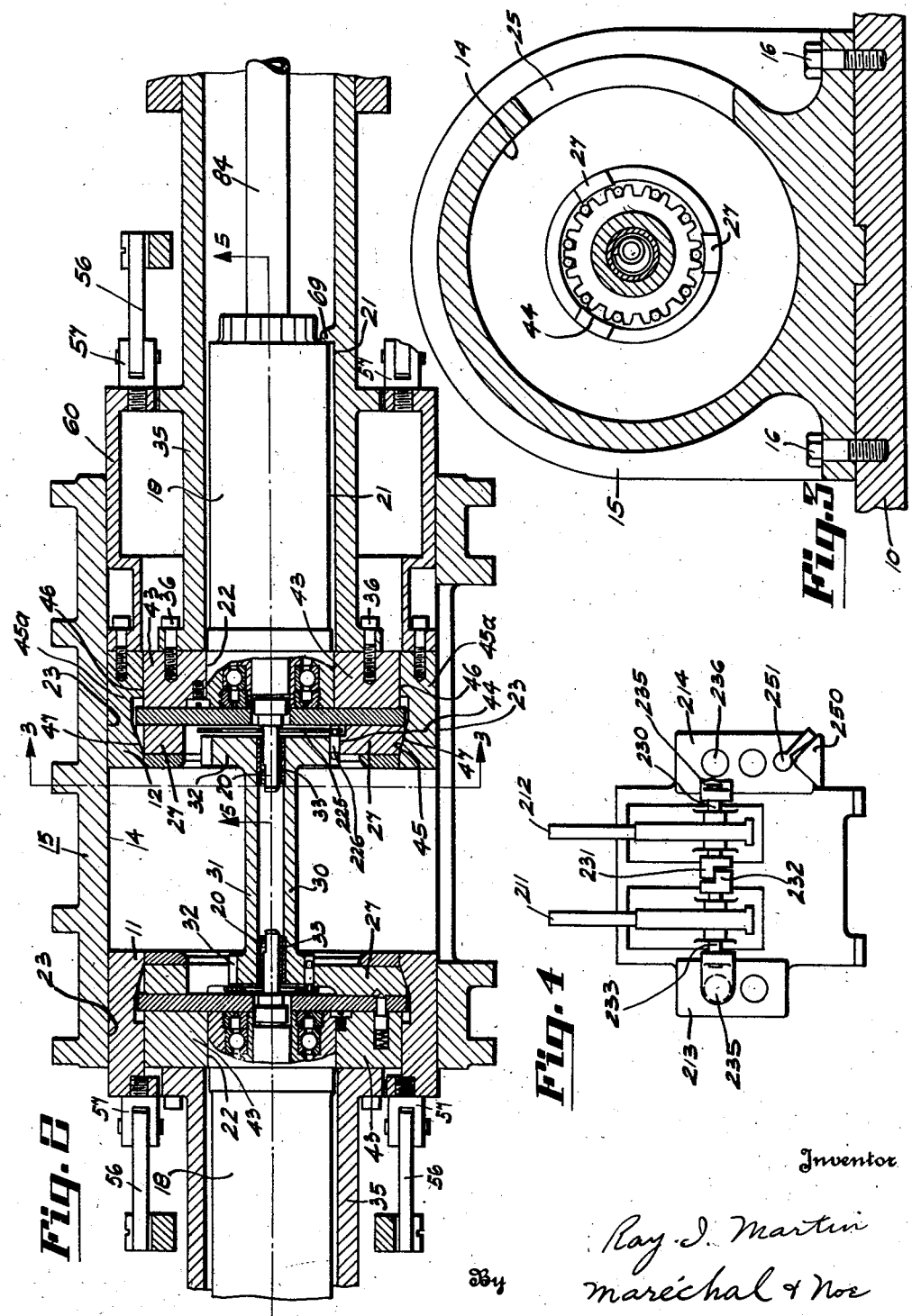

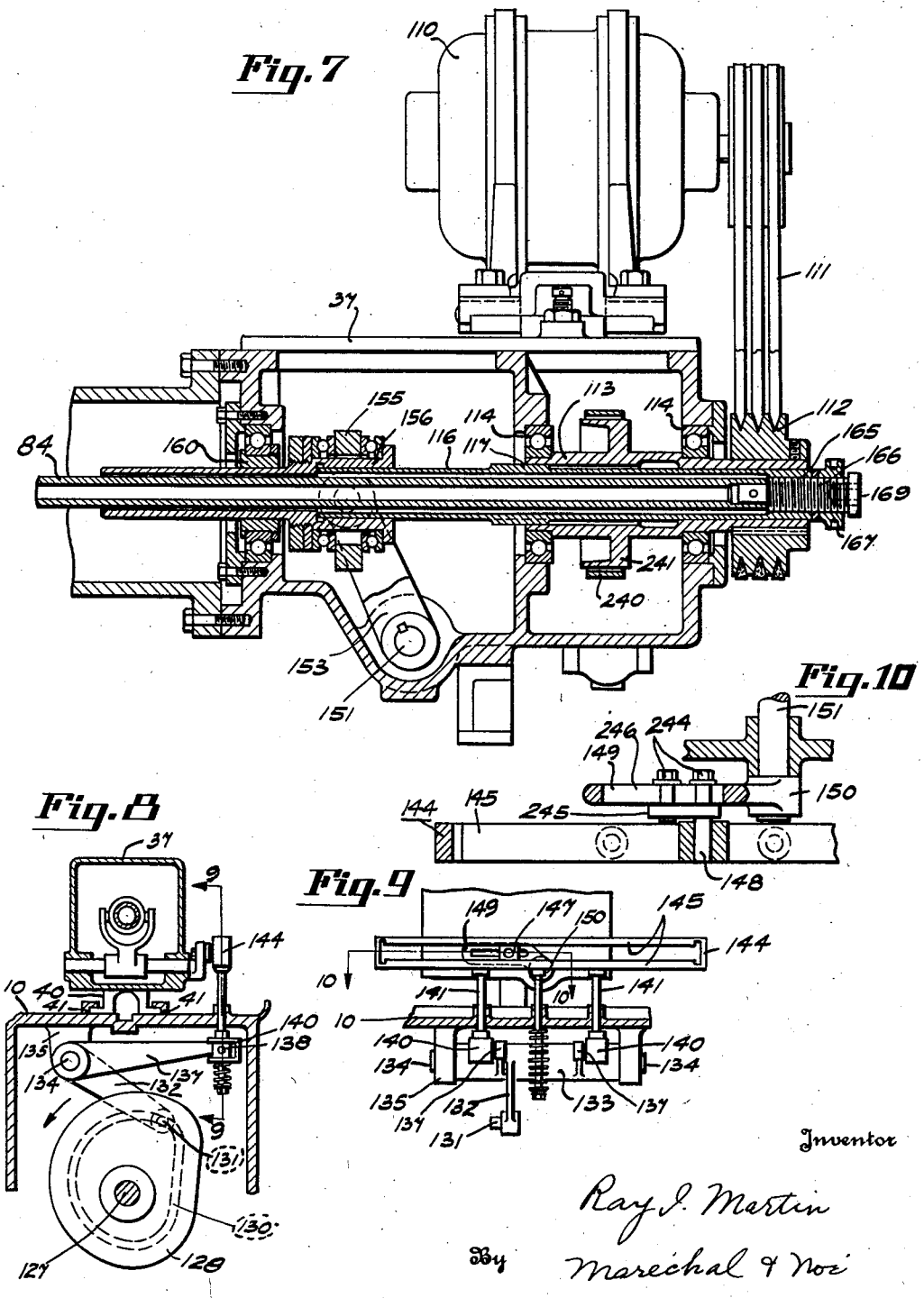

Patented Oct. 1, 1935

2,015,685

UNITED STATES PATENT OFFICE 2,015,685

MACHINE TOOL

Ray I. Martin, Dayton, Ohio, assignor, by mesne assignments, to The Cimatool Company, Dayton, Ohio, a corporation of Ohio Application August 14, 1931, Serial No. 556,970

5 Claims. (Cl. 77—3)

This invention relates to machine tools.

One of the principal objects of the invention is the provision of a machine tool for boring or otherwise machining cylindrical openings; the machine being of simple construction comprising a sturdy assembly of parts which are rigidly held in accurate alignment and may be readily regulated through a wide range of adjustment, and operable in such manner that a work piece inserted therein may be rapidly machined at spaced points with extreme precision.

Another object of the invention is the provision of a machine tool comprising a stationary work receiving member having a rotatable tool carrying spindle mounted therein and movable relatively thereto for rapid and accurate operation on a work piece while releasably held by the work receiving member.

Another object of the invention is the provision of a machine tool comprising non-rotatable work receiving means accurately held in stable position and having spaced rotatable tool carrying spindles associated therewith which are axially movable to traverse a cycle of operation in which the paths of travel of the tools are definitely and accurately related.

A further object of the invention is the provision of a machine tool having a tool carrier comprising but few parts and providing a substantial support for a tool bit which is movable in controlled amounts through minute steps of adjustment.

Other objects and advantages of the invention will be apparent from the following description, the accompanying drawings and the appended claims.

In the drawings, which illustrate a preferred embodiment of the invention—

Fig. 1 is a side elevational view of a machine tool constructed in accordance with this invention;

Fig. 2 is a sectional view taken on the line 2—2 of Fig. 1;

Fig. 3 is a sectional view taken on the line 3—3 of Fig. 2;

Fig. 4 is a detail view of the operating control;

Fig. 5 is a sectional view taken on the line 5—5 of Fig. 2;

Fig. 6 is a sectional view taken on the line 6—6 of Fig. 5;

Fig. 7 is a vertical sectional view of a portion of the spindle driving and feeding mechanism;

Fig. 8 is a sectional view taken on the line 8—8 of Fig. 1;

Fig. 9 is a sectional view taken on the line 9—9 of Fig. 8; and

Fig. 10 is a sectional view taken on the line 10—10 of Fig. 9.

The drawings, in which like characters of reference designate like parts throughout the several views thereof, illustrate a machine tool for boring spaced concentrically related holes with rapidity and extreme precision. As shown, the machine comprises generally a bed or base 10 upon which are mounted spaced work receiving members or chucks 11 and 12. The chucks stand facing one another and are definitely located in alignment within the cylindrical bore 14 of a drum 15 which is securely fixed to the machine bed by provision of bolts 16. The chuck 11 and its associated mechanism are fixedly mounted to the machine bed while the chuck 12 and its associated mechanism, although non-rotatable, may be moved axially. Each of the chucks has mounted therein a tool spindle assembly 18 which carries a rotatable boring tool 20. Each tool 20 is accurately positioned centrally of the cylindrical outer surface 21 of its spindle assembled 18, and each spindle assembly in turn is securely held within its chuck in a cylindrical bore 22 which is accurately positioned concentrically of the exterior cylindrical peripheral wall 23 of that chuck. The chuck walls 23 are a close fit within the bore 14 of the common drum 15 so that the tools 20, although supported within portions of the machine which are spaced apart, are accurately held in alignment upon a common axis. The drum 15 is provided with a side opening 25 for access to the chucks. Each of the chucks is provided with a number of radially movable jaws 27 which may be actuated to engage a work piece for operation by the tools 20.

In the illustrated embodiment of the invention the work piece is shown in the form of a cluster gear 30 such, for example, as is used in an automobile transmission. The cluster gear 30 comprises a cylindrical hub portion 31 which has formed at each end a spur gear 32. Each end of the hub has seated within it a cylindrical sleeve 33 which serves as a bearing for rotation of the gear when assembled in the structure of which it is to form a part. This machine provides a means of taking an accurate finishing cut from the face of both bushings 33 simultaneously, and the construction of the machine is such that although the finishing cuts are made by independent tools, the resulting finished surfaces are accurately aligned to a very high degree of precision.

Each of the chucks has attached to it an axially extending tube 35 which is shown attached thereto by the bolts 36. The opposite end of each of these tubes has attached to it a housing 37 which serves as an enclosure for the mechanism by which the tool spindles are driven and are moved axially. The fixed chuck 11, its tube 35 and housing 37 form a unit which is rigidly held to the machine bed by suitable bolts which extend from the bed into the housing 37, and into the supporting leg 38 which is an integral extension of the chuck tube 35. The movable chuck 12, its tube 35 and attached housing 37 form a unit which is slidably attached to the machine bed. This unit is further supported by a block 39 which is rigidly attached to the bed and which engages the tube surface in such a manner as to permit axial sliding movement of the tube. The housing 37 of the chuck 12 is supported from the bed 10 upon a bracket 40 which is guided within ways 41 of the base 10.

Each of the chucks is provided with a body portion 43 to which the tube 35 is attached, and each body portion is provided with suitable guide means for reception of the chuck jaws 27. These jaws have an inner face in the form of cylindrical segment 44 by which the work piece is engaged, and an outer tapered face 45 for engagement with a jaw actuating mechanism. The jaw actuating mechanism of each chuck is in the form of an axially movable cylindrical sleeve 44 of which the outer peripheral surface forms the exterior surface 23 of the chuck. The inner surface of this sleeve is cylindrical for a portion of its length, as indicated at 46, for sliding engagement with the outside peripheral rim of the chuck body while an adjacent portion 47 is of conical form for engagement with the ends 45 of the chuck jaws 27. Upon axial movement of the sleeve 44 the jaws 27 are caused to move radially by engagement with the conical face 47.

Hydraulic cylinders are provided for actuation of the sleeves 44 and are shown as comprising cylinders 50 which are suitably supported by brackets 51 which are attached to plate extensions 52 of the tubes 35. The movable piston of each cylinder has a projecting rod 53 which is pivotally connected to a bell crank 54 that is supported upon an axle pin 55 carried by the bracket 51. The opposite end of the bell crank is of yoke like shape and has pivotally connected to each leg of the yoke a link 56; each of which is in turn pivotally connected to a clevis 57 which is attached to the chuck structure. In the case of the fixed chuck 11, each clevis 57 is connected directly to the jaw actuating sleeve 44, while the attachment to the sleeve of chuck 12 is made through a spacing sleeve 60 which serves as a continuing extension of the sleeve 44 and provides a large area of surface engagement between the movable chuck 12 and the bore of the drum 15.

The chuck jaws 27 are constantly urged outwardly to a position of release by provision of spring pressed plungers 62 having conical ends 63 which engage a V-shaped notch 64 of each chuck jaw. The respective positioning of notch and pin is such that when the actuating sleeve 44 moves in the direction to force the jaws inwardly to engaging position, the pin 62 is caused to move in a direction to compress the spring 65 and so tension the jaw in such a manner that upon movement of the sleeve in the opposite direction each jaw will be caused to move outwardly.

Each tool spindle assembly 18 comprises a tubular spindle bar supporting member 68 which is received within the tube 35 and is closely held within the cylindrical bore 22 of the associated chuck. The adjacent ends of the oppositely positioned spindle assemblies are accurately held in alignment by being closely held in the chucks which in turn are closely held in the common drum 15. The remote ends of the spindle assemblies, although loosely received within the tubes 35, are rigidly held therein by provision of adjusting screws which permit angular adjustment of the spindle axes so that the spindles may be readily moved into accurate axial alignment. The adjusting screws 66, which threadedly engage the tubes 35, are shown spaced 90 degrees apart, and positioned to engage the end of each spindle assembly opposite to that which is held in the chuck bore 22. A shouldered brass pin 67 is positioned intermediate each screw and the spindle assembly and serves as a clamping means upon drawing tight its associated screw. These tubes 68 are securely held stationary with respect to the chucks. As shown, axial movement of each tube 68 is prevented in one direction by provision of a stop lug 69 which extends inwardly from the face 22 for engagement against the end of the tube 68. Rotation of the tube 68 relatively to the chuck and movement in the opposite direction is prevented by provision of a screw 70 which threadedly engages the chuck body 43 and has a head portion 71 which overlies and is received within a notch 72 of the tube 68. A concentrically related sleeve 75 is mounted within the tube 68 and is supported therefrom upon ball bearings 76 and 77. This sleeve 75 has a longitudinally extending cylindrical bore 79 within which is mounted a tool carrying spindle bar 80. The end of this bar which extends toward the chuck jaws is provided with a tapered opening 81 for reception of the shank of a tool carrier or boring head 82. The opposite end of the member 80 has attached thereto a flexible coupling 83 connecting to a member 84 by which the feeding and driving forces are transmitted to the bar 80. This bar 80 is of considerable length, is hardened, and is of uniform diameter throughout its length. The bar is a sliding fit within the accurately lapped cylindrical bore 85 of the sleeve 75; the fit being such that the bar may move axially with respect to the sleeve but without any side play.

Means are provided whereby the bar 80 may move axially with respect to the sleeve 75 while being connected thereto in such a manner that the sleeve is caused to rotate with the bar. As shown, the bar 80 is provided with diametrically opposite longitudinally extending grooves 87 formed in the cylindrical outer wall thereof. The sleeve 75 has formed therein diametrically opposite and aligned openings 88 within which are positioned tubular guides 89. These guides serve to hold spherical balls 90 so that they are received within the grooves 87. The balls 90 are held against radial movement by provision of a block 91 positioned within each tube 89 behind the ball 90 and maintained in place by a plug 92 which closes each opening 88; the plugs 92 being held in position by cross pins 93.

The rear end of the tube 68 carries a ball bearing 95 which supports a sleeve 96 that slidably engages the driving member 84 and serves to accurately align this member with respect to the adjacent end of the bar 80 to which it is connected by provision of the flexible coupling 83.

As shown, this coupling is in the form of perpendicularly related dove tailed joints having a spacing ball 97. This coupling, although serving to transmit driving and feeding movements to the spindle bar 80 permits a certain freedom of movement between the parts 80 and 84 so that any forces tending to disturb the balance of the rapidly rotating bar 80 will be absorbed in the coupling and will not be transferred to the tool carrying bar 80. Accurate machining of the several parts, together with the provision of ample bearing surfaces between those parts that move relatively to one another results in a sturdy structure wherein accurate alignment may be maintained between the rapidly rotating spindle and its associated stationary chuck so that the boring tool will traverse a path concentrically related to the work holding position of the chuck jaws.

To provide for lubrication of the spindle parts a drilled opening 100 extending through the tubes 35 and 68 provides communication between an oil cup 101 and the interior of the spindle. Oil supplied through this cup 101 fills the space within the tube 68 to a level controlled by the height of the overflow fitting 102. Oil escape at the ends of the tube 68 is prevented by suitable oil tight glands adjacent the tube ends as indicated at 104. The oil contained within the tube 68 may readily flow to the ball bearings 76, 77, and 95, and is supplied to the contacting bar and sleeve surfaces by provision of scoops 105. These scoops comprise projections 106 extending radially from the outer surface of the sleeve 75; drilled holes 107 providing communication between each scoop and the interior of the sleeve. Oil passing through the holes 107 is caused to traverse the length of the interengaging bar and sleeve faces through the grooves 87, from which it is further distributed by provision of an annular groove 108 on the inner face of the sleeve 75. Very little lubricant can escape from the tool carrying end of the bar 80 due to the extremely close running fit between the bar and sleeve.

Rotational movement of each spindle 18 is provided by an independent driving motor 110 mounted upon each housing 37 and connected to its respective spindle by a belt drive 111 to a pulley 112 fixed to a rotatable sleeve 113 that is mounted upon bearings 114 within the housing 37. This sleeve 113 transmits its rotational movement to an axially movable sleeve 116 which is mounted therein; the driving connection being provided by interfitting splines 117. The sleeve 116 is in turn attached to the drive member 84.

Operating control of the motors 110, as well as feeding movement of the spindles 18, is provided by mechanism attached to a main driving motor 120. This motor is started by actuation of a push button and provides the control necessary to carry the entire machine through its cycle of operation. As shown, the motor 120 carries a pulley 121 having a belt connection 122 to a pulley 123 mounted on a shaft 124 which carries also a worm 125. The worm meshes with a worm gear 126 which is fixed to a shaft 127 that extends longitudinally of the machine. The shaft 127 has fixed to it at each end a cam 128 which serves to actuate a spindle feeding mechanism, and also has connected to it a series of contactor drums 130 by which the motors 110 are energized. One of the drums 130 serves to control the stopping point of the motor 120 so that the shaft 127 will make one revolution and will then be brought to rest automatically.

As shown particularly in Fig. 8, the cam 128 is of box form and is provided with a groove 130 within which the pin end 131 of a lever arm 132 engages. This arm 132 is part of a lever structure 133 which is pivotally mounted on a pin 134 supported in brackets 135 projecting from the machine bed 10. The lever structure 133 carries also a pair of projecting arms 137 which terminate in pivot blocks 138 engaged by the yoke ends 140 of spaced vertically movable rods 141 which are slidably mounted in the machine bed. These rods 141 have attached to their upper ends a box-like frame 144 which comprises horizontally extending spaced parallel bars 145 within which a slide block 147 is received. This slide block is pivotally mounted upon a stud 148 which is adjustably attached to a lever arm 149 having a hub portion 150 fixed to a rock shaft 151. This rock shaft is mounted in bearings carried by the housing 37 and projects therethrough; having attached to it within the housing a forked lever 153. The free end of the lever 153 is connected to a yoke 155 which forms part of a shifting collar 156 that is fixed to the axially movable sleeve 116. This sleeve 116, in addition to being supported within the tube 113, has additional support in the bearing 160.

The sleeve 116 is adjustably connected to the driving member 84 for transmission of the rotational forces of the sleeve 113 as well as the axial movement of the sleeve 116 to the spindle bar 80. To permit axial adjustment of the bar 80, to which the member 84 is attached, the exposed end of the sleeve 116 is interiorly threaded at 165 for threaded engagement with the end 166 of the driving member 84. Rotational movement of the member 84 relatively to the sleeve 116 results in axial movement of the tool carrying bar 80 relatively to the shifting collar 156 by which feeding movement is imparted to the bar 80. A lock nut 167 is provided so that upon rotating the bar 84 relatively to the sleeve 116 to a position to provide for proper positioning of the boring tool, the nut 167 may be locked tight to provide a secure driving engagement. To permit of ready movement of the bar 84 and to limit the inward adjusting travel thereof a projecting end member 169 is attached to the end of the bar 84.

Manual control of the operation of the machine chucks is provided by a pair of levers 211 and 212 which serve respectively to actuate the hydraulic cylinders 50 of the jaw engaging mechanism of the chucks 11 and 12. Associated with the levers are a pair of push buttons 213 and 214 for energizing the controls whereby the motor 120 is started. The manner of chucking a work piece as indicated by the numeral 30 is to insert the piece through the opening 25 of the drum so that the gear 32 stands within the jaw opening of the chuck 11. While held in approximate alignment by the operator, chuck 12 and its associated parts are moved axially into engagement with the opposite gear 32 of the assembly by rotation of the hand wheel 220 which is geared to the rack 221 fixed to the tube 35 of the chuck 12. Upon bringing the chuck 12 into engaging position over its respective gear the operator moves lever 212 and, due to a mechanical interconnection, simultaneously moves lever 211 to admit hydraulic pressure to both cylinders 50 for simultaneous engagement of the jaws of both chucks 11 and 12.

To provide for accurate chucking of the gears pin rings are provided for assembly to the gears before chucking. A ring comprises a flat ring like member 225 from which pins 226 project perpendicularly on about the pitch line of the gear. The pins are rather loosely held by the ring and are so spaced that they may be received between the teeth of the gear which is to be chucked. The pins are accurately ground to such a diameter that they engage the gear teeth on the pitch line and, as they extend beyond the face of the teeth, they provide an engaging surface for the chuck jaws which permit the gears to be so held that the gear pitch line is accurately and concentrically positioned with respect to the axis of rotation of the spindle bar 80.

As shown, the turning axle 230 of the operating lever 212 has a jaw member 231 which overlies the jaw member 232 of the shaft 233 upon which the lever 211 is mounted. This arrangement of parts permits simultaneous actuation of the chucks when the lever 212 is moved due to the interengaging faces of the members 231 and 232; also it permits independent release of the chucks inasmuch as movement of the lever 212 to its original position does not result in movement of the lever 211. Each shaft 230 and 233 carries an extending plate 235 which, in the disengaged position of the chuck control levers, serves to cover the starting buttons 236 of the switches 213 and 214. These plates serve as safety guards and prevent starting of the machine except when the chucks are in work engaging position.

Upon moving the lever 212 so that the work is securely held by the chucks, the operator then depresses starting button 236 of the switch 214 to set the driving motor 120 into operation. This causes rotation of the shaft 127 whereupon contacts are closed at the contactors 130 to start the motors 110 to rotating. Also, upon rotation of the shaft 127, the cams 128 are rotated to cause a reciprocating movement of the frames 144 for the required feeding movement of the tool spindles. As shown in Fig. 2, the spindles are in the extended position which corresponds to their positioning upon the completion of a cut and prior to return of the spindles to their initial position. This same positioning is also shown in Figs. 7, 8, and 9. The extent of the contacting portions of those contactors which control the motors 110 is such that when the cam 128 reaches the position of maximum forward travel (as shown in Fig. 8) the motors 110 are re-energized and at the same time a brake 240 engages the brake drum 241 of each driving sleeve 113 to quickly bring each spindle to rest. The cams continue on in their movement so that the tools are brought back to starting position (as shown in Fig. 5) while the tools are at rest. The driving motor 120 is brought to rest when the proper contactor of the group 130 reaches a point which breaks the circuit of the control mechanism.

Adjustment of the feeding travel of each spindle is provided by varying the length of lever arm 149. This is accomplished by moving the pin 148 to provide a lever arm of such length that when moved angularly by the reciprocating travel of the frame 144, the pivotal movement of the shaft 151 and lever 153 will be such as to impart to the sleeve 116 and drive member 84 the desired axial movement. The reciprocatory travel of each frame 144 is constant as determined by the shape of the cam slots 130. The extent of inward movement of the tool spindles by the cams 128 is also fixed as the tool spindles are in their extreme forward feeding position when the adjusting slot for the pin 148 lies parallel to the guides 145 of the frame 144 and consequently is the same regardless of the length of lever arm. Outward movement of the spindles, that is, away from one another, may be varied by changing the setting of the pin 148, and this is provided by loosening the nuts 244 and sliding the block 245 along the slot 246 provided in the lever arm 149.

This machine is primarily intended for operating on large quantities of like parts so that generally a great many work pieces will be run through the machine before a change in setting is made to accommodate a different kind of work piece. To insure the desired high degree of precision in the work, it is of advantage, when changing the machine to operate on a different kind of work piece, to provide a different tool carrier having a desired length of sleeve portion which will permit the cutting tool to travel inwardly for the desired length of cutting travel while properly supported, and will permit it to be withdrawn an amount sufficient to pass beyond the end of the work piece for its insertion and withdrawal. The proportioning of the spindle bar 80 is such that in its extreme inward positioning of feeding travel, toward the work, the forward end of the bar does not project beyond the cylindrical bore 79 of the sleeve 75 which supports it. Such an arrangement permits an accurate boring operation as the distance from the tool 172 to its support, as determined by the forward end of the bar 80, is always constant. This limiting of the bar travel to within the confines of its support eliminates any tendency toward conical boring. When the tool has a variable overhang such as results when the bar 80, at the position of inward feeding movement, projects beyond the inner face of the sleeve 75 and thus changes the distance from the tool to its support so that it is greater at the position of maximum feeding movement than when the tool is withdrawn or is just entering the cut the difference in the unsupported length from the tool to the sleeve 57 is sufficient to cause the tool to make a tapered cut. This condition of constant overhang becomes a very important factor when it is considered that the boring limits are frequently within a tolerance of three ten-thousandths of an inch and that a tool improperly supported by having a variable overhang might easily bore a hole which is conical beyond the limits of tolerance.

Upon completing the boring operation, and after the machine has come to rest, the operator moves the lever 212 to its original position thus releasing the jaws of chuck 12 so that this chuck and its associated parts may be moved axially away from the work piece. The operator then grasps the work piece 30 and releases the lever 211 for disengagement of the jaws of chuck 11 whereupon the completed piece may be removed from the machine. Simultaneous engaging movement causes the work piece to be accurately engaged in proper position without possibility of misalignment due to one set of jaws engaging before the other set acts and thus cocking the work piece within the machine. Independent disengaging permits withdrawal of one chuck before the piece is released for removal.

If desired, this machine tool may be operated as two independent machines in which case the interfitting members 231 and 232 are disengaged and rendered inoperative, so as to permit such operation, or the machine may be used in such a manner that only one chuck is in service and the spindles are actuated alternately. The illustrated embodiment of the invention shows the operation of the machine on a cluster gear in which spaced bushings are bored simultaneously in a manner resulting in accurate alignment of the finished faces of the bushing. When so operating the machine the control mechanism is connected so that both chucks engage upon actuating the lever 212, and both motors 110 are started by the contactors 130 upon putting the motor 120 in operation by closing the switch button 236. When it is desired to have the machine operate as two independent units, it is only necessary to remove the interconnection between the levers 211 and 212, and remove the safety latch 250 from the switch 214 and move the control arm 251 to an opposite position whereby switches 213 and 214 are rendered independently operative. If, for example, a single gear having a single bushing is to be operated upon, the work may be inserted within chuck 11 operating as an independent unit so that only the boring tool of chuck 11 operates upon setting the machine into motion by actuating the starting switch 213. If it is desired to operate on a single gear having spaced concentrically related bushings the machine may be adjusted by provision of proper cams 128 and suitable contactors 130 to cause the spindles to operate alternately in which case the work piece would be engaged in chuck 11 and upon setting the machine into operation first one spindle would take its feeding cut and would return followed by a feeding cut of the opposite spindle and its return.

When the machine is used for boring bushings, tool bits such as tungsten carbide or some other suitable material which permits a high cutting speed is used. The combination of this high cutting speed, about 3000 R. P. M., together with a relatively light cut, about five thousandths of an inch, results in a finish being imparted to the bushings which is sufficiently smooth as to require no further processing. By holding the work piece stationary and rigid with respect to the tool spindles any stresses which would tend to cause distortion as a result of the rapidly rotating parts is readily controlled in the relatively light weight and easily balanced tool spindle parts. By providing this rigid assembly of sturdy members which are securely and accurately maintained in operating alignment, the machine is capable of quickly traversing its cycle of operation and of producing work which is accurate to a high degree of precision; something which has heretofore been considered impossible of accomplishment in previous machines in which the work piece and necessarily heavy work holding means have been made the rotating parts.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine tool of the character described, comprising a machine bed, spaced axially aligned non-rotatable work receiving members mounted on said bed, work engaging means on said work receiving members, and means for actuating said work engaging means comprising an independent control handle for each work receiving member, means interconnecting said handles for simultaneous actuation of the work engaging means of both receiving members to work engaging position by manual actuation of one handle in one direction, said interconnecting means being inoperative upon movement of said handle to the release position of the work engaging means for independent movement of the handles to release position.

2. In a machine tool of the character described, spaced axially aligned non-rotatable chucks, a tool spindle assembly mounted in each of said chucks, each of said spindle assemblies comprising a sleeve and a rotatable and axially movable tool carrying spindle slidably mounted therein and having a normal positioning in the sleeve in which the spindle end stands a distance from the sleeve end greater than the axial movement of the spindle, means for supporting a tool from each of said tool carrying spindles at a fixed distance from the spindle end, means for moving said tool spindles simultaneously, the extent of travel being limited to that in which the end portions are retained within the sleeves to provide a tool support of fixed length in all positions of the spindles.

3. In a machine tool of the character described, means for holding and operating upon a work piece comprising a chuck, jaws and actuating means therefor, a sleeve fixed to and extending from said chuck on the axis thereof, and a spindle assembly comprising a stationary tubular member and a spindle movable therein and adapted to carry a tool, said stationary tubular member being received within the chuck sleeve and closely held at the end adjacent the chuck, and means on the sleeve effective on the end of the tubular member remote from the chuck for angular adjustment of the spindle assembly with respect to the chuck axis.

4. In a machine tool of the character described, means for holding and operating upon a work piece comprising a chuck, jaws and actuating means therefor, a sleeve fixed to and extending from said chuck on the axis thereof, and a spindle assembly comprising a stationary tubular member and a spindle movable therein and adapted to carry a tool, said stationary tubular member being received within the chuck sleeve and closely held adjacent one end by the chuck and sleeve, the opposite end of the tubular member being loosely received within the sleeve, and angularly spaced adjusting screws on the sleeve extending perpendicularly to the chuck axis and adjustably engaging the tubular member adjacent the end remote from the chuck for angular adjustment of the spindle assembly with respect to the chuck axis.

5. In a machine tool of the character described, a rotatable and axially movable tool carrying spindle, driving means therefor axially spaced from said spindle and comprising a rotatable member, a sleeve slidably mounted in said rotatable member and in drive transmitting relationship therewith, means for axially moving said sleeve, a connecting member extending through said sleeve, a flexible coupling attaching said connecting member to said tool carrying spindle for transmission of movements thereto, and means at the end of the connecting member remote from the spindle adjustably attaching said connecting member to said sleeve whereby the positioning of said spindle may be varied with respect to the positioning of said sleeve and sleeve moving means, said adjustable attachment being adjacent the end of the sleeve remote from the spindle.

RAY I. MARTIN.

CERTIFICATE OF CORRECTION.

Patent No. 2,015,685.   October 1, 1935.

RAY I. MARTIN.

It is hereby certified that error appears in the printed specification of the above numbered patent requiring correction as follows: Page 1, second column, line 24, for "assembled" read assembly; and page 4, first column, line 51, for "re-energized" read de-enerized; and that the said Letters Patent should be read with these corrections therein that the same may conform to the record of the case in the Patent Office.

Signed and sealed this 5th day of November, A. D. 1935.

(Seal)

Leslie Frazer
Acting Commissioner of Patents.